March 2, 1971   C. A. GUDERJAHN   3,566,695
LIQUID METAL PRESSURE GAGE
Filed June 9, 1969
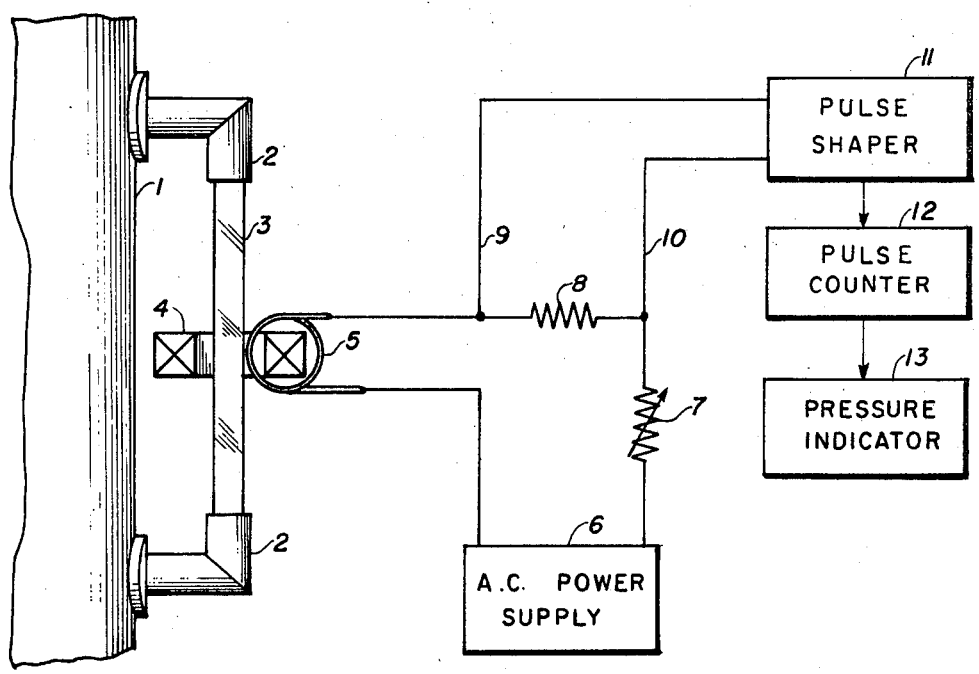
INVENTOR.
CHARLES A. GUDERJAHN
BY
ATTORNEY ＃ 3,566,695
LIQUID METAL PRESSURE GAGE
Charles A. Guderjahn, Northridge, Calif., assignor to the United States of America as represented by the United States Atomic Energy Commission
Filed June 9, 1969, Ser. No. 831,476
Int. Cl. G01l 9/00
U.S. Cl. 73—398                                    7 Claims

ABSTRACT OF THE DISCLOSURE

A liquid metal gage is provided with a venturi type sampling tube, wherein an adjustable electrical current is passed through the portion of the sampling tube. At a predetermined current flow, the temperature of the sampled liquid metal increases until vaporization occurs to interrupt the current flow. The time period during which current flowed is a function of system pressure. A sampling and counting, up to the time of vaporization, of the current pulses over a period of time indicates the pressure within the system.

BACKGROUND OF THE INVENTION

The invention described herein was made in the course of, or under, Contract No. AT(11-1)-GEN-8 with the United States Atomic Energy Commission.

This invention relates to a pressure indicator, and more particularly to a pressure indicator for a liquid metal system.

Liquid metals are frequently used as coolants or working fluids in reactors, and a problem exists in measuring the pressure of such liquid metal systems. Conventional pressure gages having moving parts, such as bellows or diaphragms, the unsuitable because of corrosion of the elements in liquid metal and high temperature atmospheres.

SUMMARY OF THE INVENTION

The present invention provides a pressure gage having no moving parts to corrode in the liquid metal. Pressure is determined by passing an electric current through a sample of the liquid metal and observing interruptions in the current caused by vaporization of the metal. Since the temperature of vaporization is dependent upon pressure, the current and time required to heat the metal to the vaporization point are easily measured indicia of the pressure. A timer including a pulse shaper and pulse counter is connected to a pressure indicator to automatically indicate the pressure within the system.

Therefore, it is an object of this invention to provide an inexpensive pressure gage system capable of use in a liquid metal atmosphere.

Another object of the invention is to provide a pressure gage for liquid metal measurement having no moving parts, and wherein pressure is determined by passing an electric current through a sample of the liquid metal and observing interruptions in the current caused by vaporization of the metal.

Other objects will become readily apparent from the following description and accompanying drawing.

BRIEF DESCRIPTION OF THE DRAWING

The single figure illustrates a preferred embodiment of this invention.

DESCRIPTION OF THE INVENTION

In the drawing a liquid metal reservoir 1 containing liquids such as sodium or mercury, for example, is partially shown. A bypass of venturi-type sampling channel 2 provides a fluid passage for a portion of the liquid metal to be sampled. A glass or metal tube 3 forms a reduced or throat portion of the venturi-type bypass system. The tube 3 in the illustrated embodiment, for example, is of the order of ½ cm. long by 2 mm. interior diameter, and is stainless steel.

A toroidal shaped magnetic core 4 is positioned around tube 3 with several turns of wire wrapped around core 4 forming a coil 5. The elements 1–5 form a transformer with the reservoir 1, channel 2 and tube 3 defining a single loop or turn secondary while the coil 5 wrapped around 4 defines a multi-turn primary whereby current is induced as known in the art.

The ends of the wire or leads of coil 5 are connected to an AC power source 6 via a rheostat 7 and an output or voltage sampling resistor 8. The rheostat 7 is provided for adjusting the current flow to a desired predetermined value. The current supply from the power source 6 to the coil 5 is adjusted to a predetermined value and flows through the liquid metal in the sampling tube 3 until vaporization of the liquid metal occurs within tube 3, as indicated by circuitry to be now described.

Lines or leads 9 and 10 are connected across output resistor 8, and supply the input terminals of pulse shaping circuit 11 with AC current pulses developed across the resistor. Shaper 11 is of conventional square wave or other type, and provides an output pulse to the pulse counting circuit 12 for each half cycle of AC wave received. Shaper 11 contains a voltage discriminator circuit so that the pulse train is interrupted when the current in resistor 8 is reduced substantially by the formation of a vapor bubble. The output from the pulse counter 12 is fed to a pressure indicating meter or recorder 13, which may be of the analog or digital type.

The pressure indication is calibrated for indicating liquid metal pressure based upon the predetermined current flow through the liquid metal.

As the current flows through the sampling tube, it has been found that the temperature of the liquid metal increases. The liquid metal temperature rises until the temperature of vaporization is reached and a vapor bubble is produced. By using a very small diameter tube having an internal diameter of the order of such vaporized bubble, current flow is automatically interrupted, partially or totally.

Since the temperature of vaporization is a function of the pressure of the liquid metal system, and the time during which the current flowed is also a function of the system pressure.

Thus, since the pulse shaper 11 and pulse counter 12 are an electrical timer system, the output of the timer is effectively an indication of pressure which may be indicated at 13. The meter 13 is calibrated for a predetermined current flow, and it will be obvious that this calibration may be automatically correlated to the current flow.

If desired, the current flow may also be increased at an adjustable predetermined rate by varying rheostat 7 mechanically or electronically.

If desired, the transformer arrangement illustrated in the drawing can be replaced by a direct heating arrangement by eliminating core 4 and coil 5 and having the leads from power supply 6 and resistor 8 terminate as or connected to a pair of spaced electrodes in sampling tube 3 secured therein by appropriate insulators. However, the embodiment illustrated provides increased reliabilities over the electrode arrangement.

Having thus described the invention, it will be apparent to those skilled in the art that modifications may be made within the scope hereof. Accordingly, the invention is defined in the appended claims.

I claim:
1. A liquid metal pressure gage for an associated liquid metal system comprising a liquid metal sampling tube operatively connected to an associated liquid metal sys- tem, means for providing a predetermined current flow through associated liquid metal in said tube over a time period sufficient to cause vaporization of liquid metal therein, said sampling tube including at least a portion thereof having an internal cross-sectional area substantially smaller than the internal cross-sectional area of adjacent portions of said associated liquid metal system, the internal cross-sectional area of said portion of said sampling tube being such that a vaporized bubble produced by flowing current through liquid metal in said portion of said sampling tube causes at least partial interruption of current flowing therethrough, means operatively connected to said first mentioned means for sampling the current flowing through said first mentioned means over said time period, and a pressure indicator means operatively connected to said sampling means and calibrated for indicating the pressure of liquid metal in an associated system based upon the predetermined current flow through said first mentioned means.

2. The liquid metal pressure gage defined in claim 1, wherein said sampling means includes a pulse shaper and a pulse counter for counting current pulses over the time period required for vaporization.

3. The liquid metal pressure gage defined in claim 1, wherein said first mentioned means includes a transformer means, and wherein said sampling tube comprises a portion of said transformer means.

4. The liquid metal pressure gage defined in claim 3, in combination with a liquid metal reservoir means, said sampling tube being fixedly secured to said reservoir means so as to provide electrical continuity therebetween, and wherein said sampling tube and at least a portion of said reservoir function as a secondary winding portion of said transformer means.

5. The liquid metal pressure gage defined in claim 3, wherein said transformer means includes a primary winding portion thereof composed of a core means and coil means wrapped around at least a portion of said core means, and wherein said sampling tube comprises at least part of a secondary winding portion of said transformer means.

6. The liquid metal pressure gage defined in claim 3, wherein said first mentioned means includes an AC power source, a resistor means and a rheostat means serially connected with a primary winding portion of said transformer means.

7. The liquid metal pressure gage defined in claim 6, wherein said current flow sampling means is operatively connected across said resistor means.

References Cited

UNITED STATES PATENTS

| | | | |
|---|---|---|---|
| 2,709,785 | 5/1955 | Fielden | 324—30(A) |
| 2,842,964 | 7/1958 | Campana et al. | 73—398X |
| 3,229,524 | 1/1966 | Jewell | 73—398 |
| 3,312,966 | 4/1967 | Schaller | 340—239 |
| 3,424,007 | 1/1969 | Pasnak et al. | 73—398 |
| 3,459,043 | 8/1969 | Young | 73—398X |

OTHER REFERENCES

Publication: "Low Impedance Bridge for Measurement of Level of Liquid Metals" by Julius Hyman, Jr. The Review of Scientific Instruments, vol. 32, No. 7, July 1961, pp. 833–837.

LOUIS R. PRINCE, Primary Examiner

D. M. YASICH, Assistant Examiner

U.S. Cl. X.R.

324—30; 340—239